United States Patent
Nitto

(10) Patent No.: US 9,287,805 B2
(45) Date of Patent: Mar. 15, 2016

(54) VIBRATION-TYPE ACTUATOR AND IMAGING APPARATUS

(71) Applicant: CANON KABUSHIKI KAISHA, Tokyo (JP)

(72) Inventor: Kiyoshi Nitto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 13/961,037

(22) Filed: Aug. 7, 2013

(65) Prior Publication Data

US 2014/0043515 A1 Feb. 13, 2014

(30) Foreign Application Priority Data

Aug. 10, 2012 (JP) ................................ 2012-178056

(51) Int. Cl.
*H02N 2/10* (2006.01)
*H02N 2/00* (2006.01)

(52) U.S. Cl.
CPC .............. *H02N 2/103* (2013.01); *H02N 2/006* (2013.01); *H02N 2/106* (2013.01); *Y10T 74/18568* (2015.01)

(58) Field of Classification Search
CPC ....... H02N 2/026; H02N 2/163; H02N 2/103; H02N 2/08; H02N 2/006; H02N 2/106
USPC .............. 310/323.01, 323.02, 323.03, 323.13
See application file for complete search history.

(56) References Cited

U.S. PATENT DOCUMENTS

| | | | | |
|---|---|---|---|---|
| 6,198,202 B1* | 3/2001 | Tamai et al. | ............. | 310/323.15 |
| 6,628,046 B2* | 9/2003 | Seki | ........................ | H02N 2/106 |
| | | | | 310/323.04 |
| 6,720,707 B2* | 4/2004 | Tamai | ..................... | H02N 2/12 |
| | | | | 310/323.01 |
| 7,109,638 B2* | 9/2006 | Kitahara | ............. | H01L 41/0906 |
| | | | | 310/323.01 |
| 7,545,078 B2* | 6/2009 | Ostendarp | ............. | B23B 29/125 |
| | | | | 310/312 |
| 2013/0113340 A1* | 5/2013 | Tsuchiya | ...................... | 310/341 |

FOREIGN PATENT DOCUMENTS

| | | |
|---|---|---|
| JP | 62-277078 A | 12/1987 |
| JP | 4-91671 A | 3/1992 |
| JP | 3416233 B2 | 6/2003 |
| JP | 2012-29495 A | 2/2012 |
| JP | 2012-124705 A | 6/2012 |

* cited by examiner

*Primary Examiner* — Shawki S Ismail
*Assistant Examiner* — Bryan Gordon
(74) *Attorney, Agent, or Firm* — Canon USA Inc. IP Division

(57) ABSTRACT

A vibration-type actuator includes a vibration member, a driven member configured to move relative to the vibration member by a vibration of the vibration member, an output member connected to the driven member, a shaft inserted in a through-hole in the vibration member, a fixing member coupled to the shaft and configured to support the output member, and a coil spring provided between the driven member and the output member and configured to bring the driven member into pressure contact with the vibration member. The coil spring includes, at an end portion thereof, a first end turn portion with a plural number of turns. The coil spring is connected to the output member at the first end turn portion. The thickness of the first end turn portion is greater than a gap between the driven member and the output member.

9 Claims, 7 Drawing Sheets

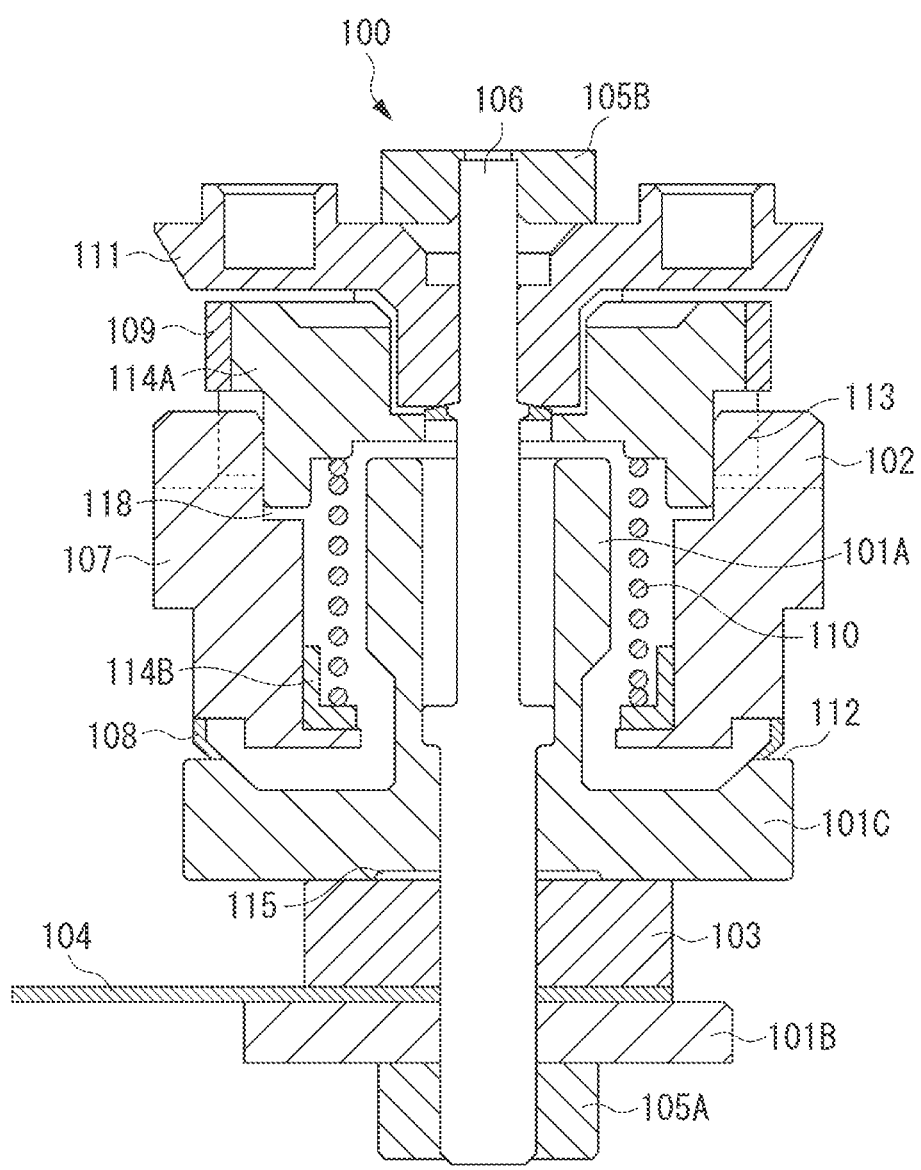

VIBRATION-TYPE ACTUATOR AND IMAGING APPARATUS

BACKGROUND OF THE INVENTION

1. Field of the Invention

The present invention relates to a vibration-type actuator for use in camera lenses and office automation (OA) equipment in which an electro-mechanical energy conversion element produces an elliptic motion on a surface of a vibration member to relatively move the vibration member and a driven member. The present invention also relates to an imaging apparatus.

2. Description of the Related Art

In recent years, a vibration-type actuator (vibration wave driving apparatus) has been used in various fields. In the vibration-type actuator, a distortion generating element that generates a mechanical distortion in response to the action of an electric or magnetic field vibrates a vibration member, and the vibration of the vibration member is converted into a continuous or intermittent mechanical motion and then output.

Among piezoelectric actuators using a piezoelectric element, an actuator called an ultrasonic motor can constitute a continuous rotation driving source.

Hence, the ultrasonic motor has been used as a driving source as a substitute for a conventional rotary electromagnetic driving motor in an optical apparatus such as a camera. Driving control techniques for the ultrasonic motor have practically been established.

Although techniques relating to ultrasonic motors have practically been established, further improvement is necessary in motor performance stabilization techniques.

A vibration-type actuator (ultrasonic motor) that produces bending-mode vibrations of the same shape in a plurality of different planes is discussed in publications such as Japanese Patent Application Laid-Open No. 4-91671. Drive principles are discussed in detail in the publications. Vibration members discussed in the publications include an electro-mechanical energy conversion element and elastic members. In a vibration member, the electro-mechanical energy conversion element is sandwiched and fixed by the elastic members in both sides. The vibration-type actuator that produces bending-mode vibrations of the same shape in a plurality of different planes enables driving by generating an elliptic motion of surface particles of the vibration member, bringing a driven member into pressure contact with the vibration member, and continuously driving the driven member.

In a piezoelectric element, a pattern electrode is formed, and substantially sinusoidal alternating voltages with time phases that differ by 90 degrees are sequentially applied to each electrode.

When alternating voltages having frequencies near the natural vibration frequencies of the vibration modes to be produced are applied, the vibration member is resonated by the bending moment applied to the vibration member by expansion and contraction of the piezoelectric element.

The vibration modes produced with respect to the alternating voltages that differ by 90 degrees have the same shape and different phases, and are combined to generate an elliptic motion of the surface particles of the vibration member. The vibration modes of the vibration-type actuator that produces bending-mode vibrations of the same shape in a plurality of different planes have the same deformation distribution. Hence, the vibration-type actuator has a characteristic that the resonance frequencies are less likely to be changed by the vibration direction and, thus, substantially no adjustment is required to match the resonance frequencies of two modes.

For the vibration-type actuator to perform highly-accurate driving, friction contact surfaces of the driven member and the vibration member are desirably vertical to the direction of a shaft and have no inclination with respect to the shaft. Hence, both end surfaces of a coil spring of a pressurization spring are polished to reduce inclination. For high responsiveness, an external output is output by a gear without a spring and a vibration-proof rubber. Compared with a plate spring and a disc spring, the coil spring enables easy adjustment of pressing force because a large stroke can be set and the spring constant can be decreased. Being made of a metal, the coil spring has advantages that the pressing force is less likely to be decreased by temporal change due to little settling and little effect of temperature and humidity. This enables provision of a vibration-type actuator that delivers stable friction torque for a long time.

In a conventional structure of a pressurization unit of the vibration-type actuator, end turns at both end surfaces of the coil spring of a pressurization spring are polished. This causes a problem that, since the thickness of an end turn portion at an end portion of the coil spring during assembly becomes smaller than a gap to be formed after assembly of a rotor and a gear, if the coil spring is bent, the end turn portion will enter and be caught in the gap between the rotor and the gear. Thus, friction contact surfaces are not uniformly pressed to cause uneven rotation. Furthermore, the surface pressure increases partially to increase abrasion of the friction contact surfaces. As illustrated in FIG. 5, the coil spring of the pressurization spring has an end portion of winding, and the pressing force of that portion becomes different from those of other portions of the end surface to cause pressure unevenness. When the number of turns in the end turn portion is one, the rigidity difference between a spring receiving member and a surface that is in contact with the spring receiving member becomes 10 times or more. This results in an uneven friction contact state to cause uneven abrasion and driving. Furthermore, when side surface portions other than the end turn portion of the coil spring interfere with other components, pressure unevenness and abnormal noise are produced.

The foregoing matter will be described below in more detail with reference to an example of a structure of a pressurization unit of a vibration-type actuator illustrated in FIG. 4. As illustrated in FIG. 4, a spring receiving member 114A of a gear 109 is connected to a coil spring 110 at an outer side of the coil spring 110. Between the gear 109 and a rotor 107 is formed a gap 118 of a certain size to allow the rotor 107 to move freely in the thrust direction with respect to the gear 109. Since the thickness of an end turn portion 110A at an end portion of the coil spring 110 is smaller than the gap 118 to be formed after assembly of the rotor 107 and the gear 109, if the coil spring 110 is bent during assembly, the end turn portion 110A will enter and be caught in the gap between the rotor 107 and the gear 109. The gap 118 between the gear 109 and the rotor 107 has a role to prevent a contact spring 108 from being pressed against a friction driving member 112 with excessive force during assembly.

SUMMARY OF THE INVENTION

The present invention is directed to a vibration-type actuator that prevents an end turn portion at an end portion of a coil spring from being caught in a gap between a rotor and a gear during assembly to enable stable driving.

According to an aspect of the present invention, a vibration-type actuator includes a vibration member, a driven member configured to move relative to the vibration member by a vibration of the vibration member, an output member connected to the driven member, a shaft inserted in a through-hole in the vibration member, a fixing member coupled to the shaft and configured to support the output member, and a coil spring provided between the driven member and the output member and configured to bring the driven member into pressure contact with the vibration member, wherein the coil spring includes, at an end portion thereof, a first end turn portion with a plural number of turns, wherein the coil spring is connected to the output member at the first end turn portion, and wherein a thickness of the first end turn portion is greater than a gap between the driven member and the output member.

As used herein, the term "driven member" refers to a member that is moved relative to a vibration member by a vibration of the vibration member. The relative movement of the vibration member and the driven member includes not only a case where the vibration member is fixed and the driven member is moved but also a case where the driven member is fixed and the vibration member is moved.

As used herein, the term "rotor" refers to a portion of a rotating driven member when the driven member is rotated. For convenience, the portion is also referred to as a rotor in a case where the driven member is fixed and the vibration member is rotated.

As used herein, the term "end turn portion" of a coil spring refers to a portion, which appears to be flat, at an end portion and does not function as a spring. Accordingly, the phrase "the number of turns in an end turn portion of a coil spring is a plural number" means that the number of turns in the end turn portion of the coil spring, in which adjacent portions are in contact with each other and do not function as a spring, is a plural number.

Further features of the present invention will become apparent from the following description of exemplary embodiments with reference to the attached drawings.

BRIEF DESCRIPTION OF THE DRAWINGS

FIG. 6 is a view illustrating a structure of a vibration-type actuator.

DESCRIPTION OF THE EMBODIMENTS

Figure 1:
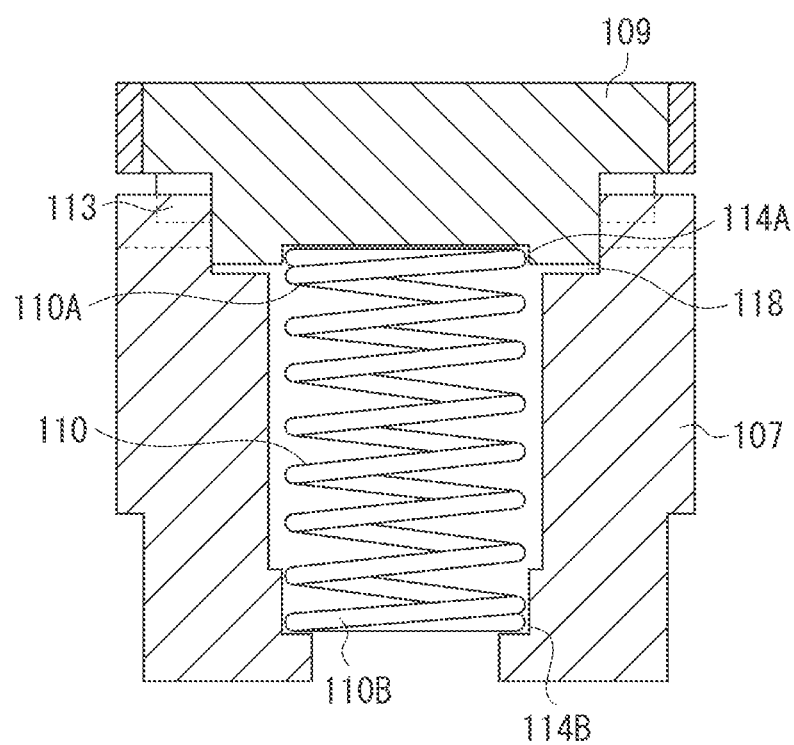
FIG. 1 is a view illustrating a structure of a pressurization unit of a vibration-type actuator.

Exemplary embodiments of the present invention will be described.

The following describes an example of a structure of a vibration-type actuator according to a first exemplary embodiment. The vibration-type actuator produces an elliptic motion of a friction driving member of a vibration member to relatively move a driven member that is in contact with the friction driving member of the vibration member.

An example of a structure of a vibration-type motor 100 will be described below, with reference to FIG. 6.

The vibration-type motor 100 illustrated in FIG. 6 is a vibration-type actuator.

A through-hole is formed in a central portion of a vibration member including a first elastic member 101A, a third elastic member 101C, and an electro-mechanical energy conversion element, a central portion of a flexible substrate 104, and a central portion of a second elastic member 101B. A shaft 106 is inserted in the through-hole. In the present exemplary embodiment, a piezoelectric element 103 is used as an electro-mechanical energy conversion element. The shaft 106 includes a step at a middle part, and the step contacts a step provided for an inner wall of the first elastic member 101A. A screw is formed at a tip (lower end) portion of the shaft 106. A first fastening member 105A, which is a fastening member, is fit to the screw and fastened to fix the second elastic member 101B, the flexible substrate 104, the piezoelectric element 103, the third elastic member 101C, and the first elastic member 101A. A side of the third elastic member 101C that is in contact with the piezoelectric element 103 includes a depressed portion 115 so that the third elastic member 101C and the piezoelectric element 103 are in contact with each other at peripheries.

A driven member 102 includes a rotor 107 and a contact spring 108 fixed to the rotor 107. The contact spring 108 is brought into pressure contact with a surface of a friction driving member 112 on the side of the third elastic member 101C that is not in contact with the piezoelectric element 103.

The contact spring 108 is elastic. The contact spring 108 is fixed to the rotor 107 to rotate together. The piezoelectric element 103 is provided on a first surface of the third elastic member 101C. The first elastic member 101A is provided as a protruding portion on a second surface of the third elastic member 101C. The second surface is on the opposite side to the first surface and is bought into pressure contact with the driven member 102. The first elastic member 101A faces an inner side portion of the rotor 107. A gear (an output member) 109 is an output unit and fit to the rotor 107 at two detents 113 to allow movement of the rotor 107 in the direction of a rotational shaft and to follow the rotational movement of the rotor 107. A coil spring 110 is a pressure unit provided between a spring receiving member 114B of the rotor 107 and a spring receiving member 114A of the gear 109 to press the rotor 107 downward in the direction of the third elastic member 101C.

The gear 109 is axially supported by a fixing member 111 coupled to the shaft 106. The fixing member 111 regulates the position of the gear 109 in the axial direction. A screw is formed at a tip (upper end) portion of the shaft 106 that is not fit to the first fastening member 105A. A second fastening member 105B is fit to the screw to fix the shaft 106 to the fixing member 111. The fixing member 111 includes a screw hole. The fixing member 111 is fixed with a screw to a desired portion, so that the vibration-type motor can be attached to the desired portion.

As described in, for example, a patent document (Japanese Patent No. 3,416,233), the piezoelectric element 103 includes electrode films formed on both surfaces of a single piezoelectric member. The electrode film on one of the surfaces is divided into four electrode films to form phases A(+), A(−), B(+), and B(−). The four regions where the electrode film is formed are polarized in the thickness direction of the piezoelectric element 103 such that the phases A(+) and A(−) are opposite to each other and the phases B(+) and B(−) are opposite to each other, and two groups, the phases A and B, are formed.

When a driving signal is applied to one of the group electrodes, one of the regions of the piezoelectric element 103 expands in the thickness direction, while the other one of the regions shrinks in the thickness direction. When a driving signal with a phase that is temporally shifted by 90 degrees is applied to a piezoelectric member of the other one of the group electrodes, two bending vibrations (the amplitude directions of the two bending vibrations are vertical to the axial direction of the shaft 106, and the phases are shifted by 90 degrees with respect to each other) are generated at the vibration member to move the first elastic member 101A from side to side. When the vibrations are combined together, an elliptic motion is produced at the friction driving member 112 on the surface of the third elastic member 101C.

When the contact spring 108 is brought into pressure contact with the friction driving member 112 on the surface of the third elastic member 101C where the elliptic motion is produced, the driven member 102 including the contact spring 108 and the rotor 107 is pushed and moved by the elliptic motion.

The following describes a structure of the pressurization unit of the vibration-type actuator according to the present exemplary embodiment, with reference to FIG. 1.

FIG. 1 illustrates a structure of the pressurization unit of the vibration-type actuator according to the present exemplary embodiment. In the pressurization unit, the coil spring 110 is provided in a space surrounded by the gear 109, which is the output member, the driven member, and the vibration member. The coil spring 110 includes a first end turn portion 110A at one end portion. The number of turns in the first end turn portion 110A is a plural number. The coil spring 110 also includes a second end turn portion 110B at another end portion. The number of turns in the second end turn portion 110B is a plural number. In the present exemplary embodiment, each of the first end turn portion 110A and the second end turn portion 110B is an end turn with the number of turns of two. The thickness of the first end turn portion 110A at the end portion of the coil spring 110 on the side that is close to the spring receiving member 114A of the gear 109 is set greater than the gap 118 between the gear 109 and the rotor 107. The number of turns of the coil spring in the first end turn portion 110A is set to a plural number, and the thickness is set greater than the gap 118, whereby assembly with the end portions of the coil spring being caught in the gap 118 can be prevented. For convenience of description, the size of the gap 118 is emphasized in each drawing, and the relative size with respect to other components is not accurate.

The first end turn portion 110A of the coil spring 110 is fit to the spring receiving member 114A of the gear 109 only at an outer side surface of the first end turn portion 110A. The spring receiving member 114B of the rotor 107 is fit to the second end turn portion 110B and the coil spring 110 at outer side surfaces of the second end turn portion 110B and the coil spring 110. By this way, the coil spring 110 can be connected with the central axes of the coil spring 110 and the gear 109 and the central axes of the coil spring 110 and the rotor 107 being aligned (concentrically). This can reduce pressure unevenness at contact portions of the vibration member and the driven member 102.

Although the present exemplary embodiment has been described as an example of the structure in which the driven member 102 is rotated, the present invention is not limited to the structure, and the vibration member may be rotated in place.

Figure 2:
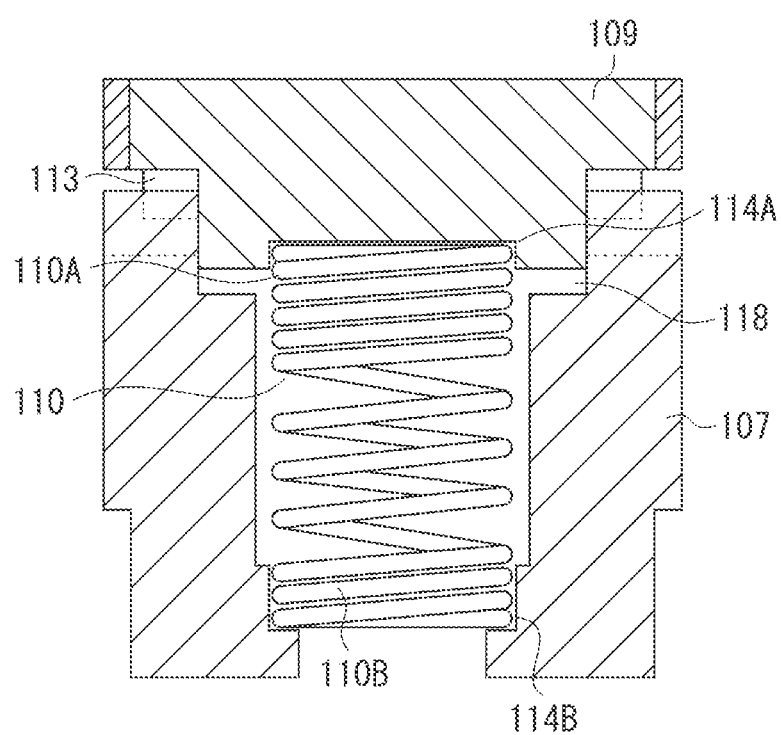
FIG. 2 is a view illustrating a structure of a pressurization unit of a vibration-type actuator.

The following describes an example of a structure according to a second exemplary embodiment, which is different from the first exemplary embodiment, with reference to FIG. 2.

As to end turns at end portions of a coil spring 110, the number of turns in a first end turn portion 110A of the coil spring 110 connected to a spring receiving member 114A of a gear 109 is six, and the number of turns in a second end turn portion 110B of the coil spring 110 on the side of a spring receiving member 114B of a rotor 107 is four. The thickness of the first end turn portion 110A of an end portion of the coil spring 110 on the side that is close to the spring receiving member 114A is set greater than a gap 118 between the gear 109 and the rotor 107. The coil spring 110 is connected to the spring receiving member 114A of the gear 109 only at an outer side surface of the first end turn portion 110A. The coil spring 110 is connected to the spring receiving member 114B of the rotor 107 only at an outer side surface of the second end turn portion 110B of the coil spring 110.

The number of turns in the first end turn portion 110A of the coil spring 110 is set to a plural number, and the thickness is set greater than the gap 118, whereby assembly with the end portion of the coil spring caught in the gap 118 can be prevented. Further, the coil spring 110 can be connected with the central axes of the coil spring 110, and the gear 109 and the central axes of the coil spring 110 and the rotor 107 being aligned (concentrically), whereby pressure unevenness at contact portions of the vibration member and the driven member 102 can be reduced. Furthermore, side surfaces other than the end turn portions are configured not to interfere with other components, whereby pressure unevenness due to the interference can be prevented.

Figure 3:
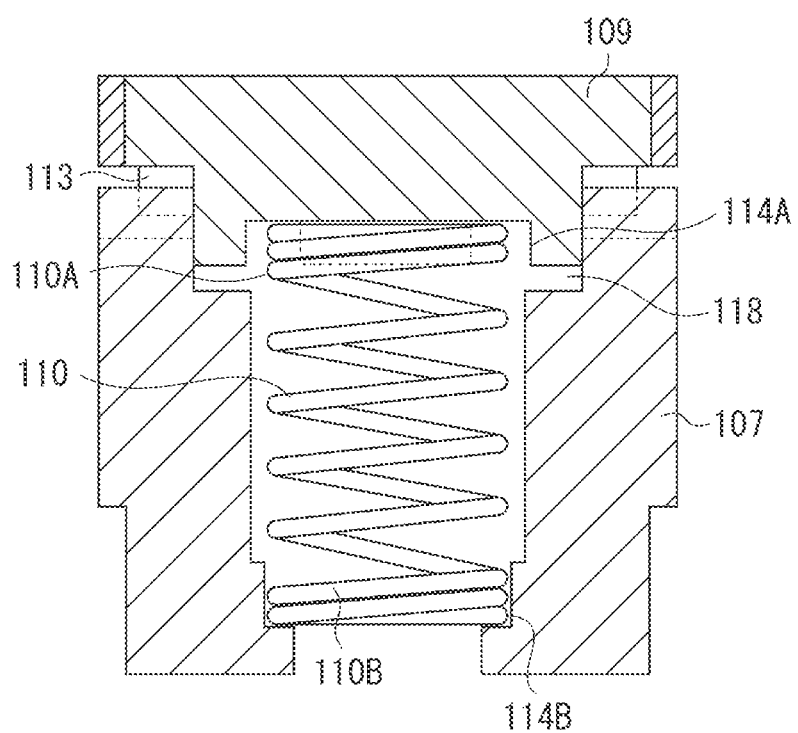
FIG. 3 is a view illustrating a structure of a pressurization unit of a vibration-type actuator.
Figure 4:
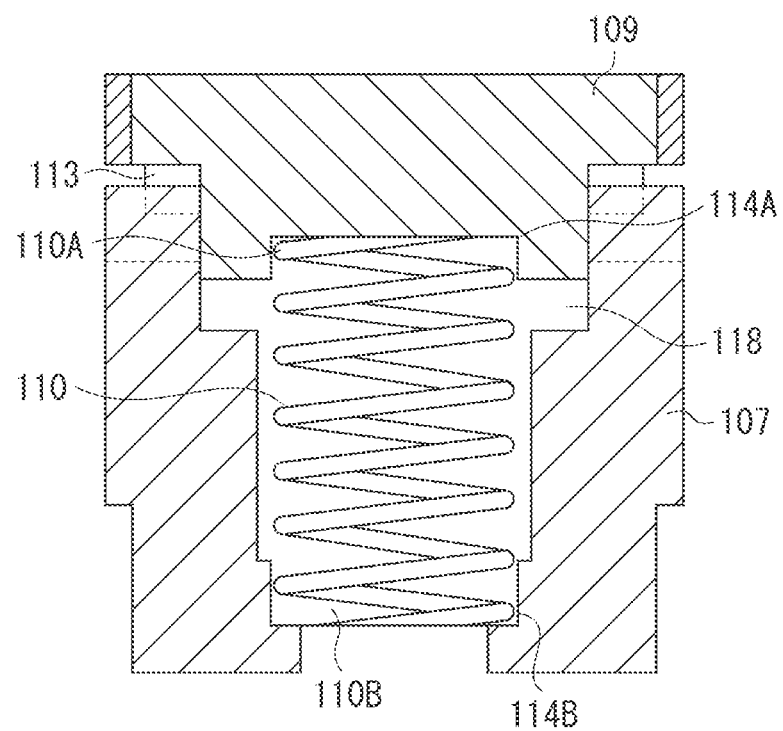
FIG. 4 is a view illustrating a conventional structure of a pressurization unit of a vibration-type actuator.

The following describes an example of a structure according to a third exemplary embodiment, which is different from the first and second exemplary embodiments, with reference to FIG. 3.

As to end turns at end portions of a coil spring 110, the number of turns in a first end turn portion 110A, which is on the side close to a spring receiving member 114A of a gear 109, is three, and the number of turns in a second end turn portion 110B, which is on the side close to a spring receiving member 114B of a rotor 107, is also three. The thickness of the first end turn portion 110A of an end portion of the coil spring 110 on the side that is close to the spring receiving member 114A of the gear 109 is set greater than a gap 118 between the gear 109 and the rotor 107. The number of turns of the coil spring in the end turn portion 110A is set to a plural number, and the thickness is set greater than the gap 118, whereby assembly with the end portion of the coil spring caught in the gap 118 can be prevented.

The first end turn portion 110A of the coil spring 110 is fit to the spring receiving member 114A of the gear 109 only at an inner side surface of the first end turn portion 110A. The second end turn portion 110B of the coil spring 110 is fit to the spring receiving member 114B of the rotor 107 only at an outer side surface of the second end turn portion 110B. By this way, the coil spring 110 can be connected with the central axes of the coil spring 110 and the gear 109, and the central axes of the coil spring 110 and the rotor 107 being aligned (concentrically), whereby pressure unevenness at contact portions of the vibration member and the driven member 102 can be reduced.

The structure in which the first end turn portion 110A of the coil spring 110 is connected only at the inner side surface of the first end turn portion 110A and that prevents interference with an elastic member 101A provided in the coil spring 110 is advantageous in terms of efficient use of space. The structure in which the second end turn portion 110B of the coil spring 110 is connected only at the outer side surface of the second end turn portion 110B to prevent interference with side surfaces of the rotor 107 and the gear 109 provided outside the coil spring 110 is advantageous in terms of efficient use of space.

Figure 5A:
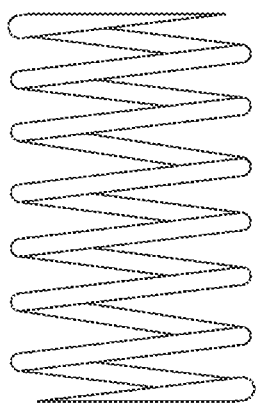
FIG. 5A is a lateral view of a coil spring.
Figure 5B:
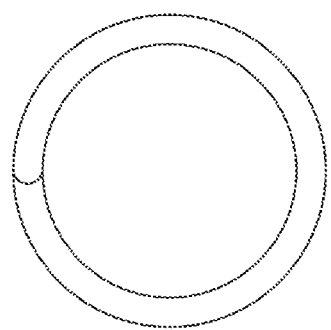
FIG. 5B is a plan view of the coil spring.

The relationship between the gap between the gear and the rotor and the thickness of the end portion of the coil spring is not limited to the exemplary embodiment of the present invention, and any relationship that can prevent the end portion of the coil spring from being caught may be employed. When the number of turns in the end turn portion is one as illustrated in FIG. 5, the rigidity difference between the spring receiving member and the surface that is in contact with the spring receiving members is ten times or more. When the number of turns is two, the rigidity difference is two times. When the number of turns is three, the rigidity difference is 1.5 times. As the number of turns is increased, the rigidity difference is gradually decreased. Thus, a larger number of turns is advantageous with respect to pressure unevenness.

Figure 7:
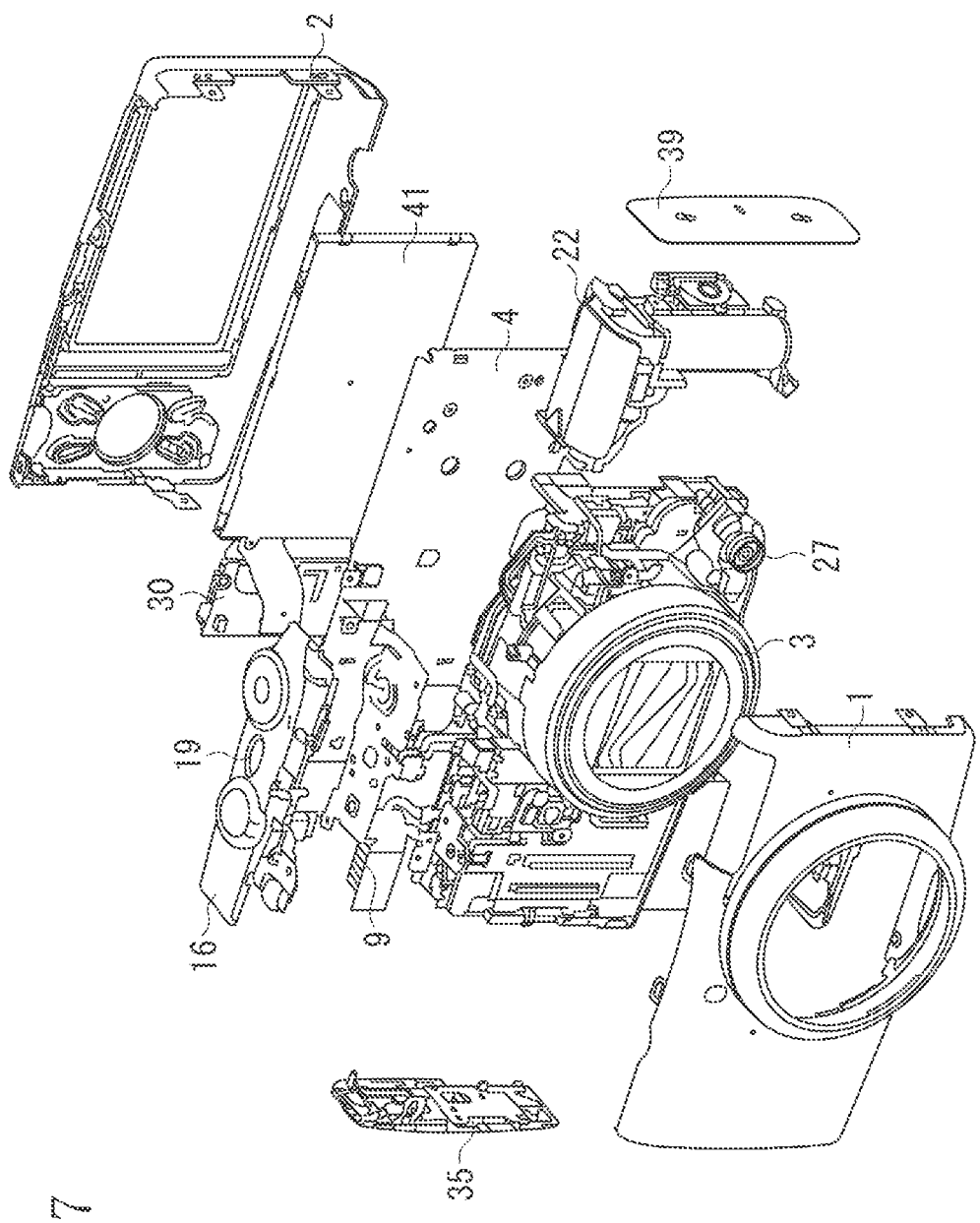
FIG. 7 is a view illustrating an application example of a vibration-type actuator.

The following describes a fourth exemplary embodiment, which is an application example of the first to third exemplary embodiments, with reference to FIG. 7. The present exemplary embodiment will describe an example in which a vibration-type actuator according to any one of the first to third exemplary embodiments is used in an imaging apparatus.

FIG. 7 is an exploded perspective view of a digital camera, which is an example of the imaging apparatus, viewed from the front surface side. The digital camera according to the present exemplary embodiment includes a lens barrel 3, a chassis 4, and a liquid crystal panel 41 between a front surface cover 1 and a back surface cover 2. The lens barrel 3, the chassis 4, and the liquid crystal panel 41 are provided in this order from the front surface side to the back surface side. A side surface cover 35 constitutes an exterior of a side portion of the digital camera on the left side viewed from the front side (object side). The side surface cover 35 is fixed to the chassis 4 with a screw. An upper surface flexible wiring board 9 is a connector connected onto a main wiring substrate 6. An upper surface cover 16 is provided on an upper surface side of the upper surface flexible wiring board 9. The upper surface cover 16 holds a power button 19. The upper surface cover 16 may also hold a zoom button, a release button, and a mode dial. A vibration-type actuator 27 is provided adjacent to the lens barrel 3 on the right side viewed from the front side (object side). Any of the vibration-type actuators according to the first to third exemplary embodiments can be used as the vibration-type actuator. Above the vibration-type actuator 27 is provided a flash unit 22 fixed to the lens barrel 3 with a screw. A side surface cover 39 constitutes an exterior of a side portion of the digital camera on the right side viewed from the front side (object side), and is fixed to the chassis 4 with a screw. A side portion of a liquid crystal panel 41 as a display panel is connected to a back surface operation flexible wiring board 30. The side portion is fixed to the chassis 4. In the present exemplary embodiment, the vibration-type actuator 27 is used to drive a zoom lens, but exemplary embodiments of the present invention are not limited to the present exemplary embodiment. For example, the vibration-type actuator according to any one of the first to third exemplary embodiments may drive an image sensor, which is not illustrated.

Use of the vibration-type actuator according to any of the first to third exemplary embodiments allows a friction contact surface to be pressed uniformly to enable stable driving with reduced uneven rotation. Use of the vibration-type actuator according to any of the first to third exemplary embodiments can also prevent a side surface portion of the coil spring other than end turn portions from interfering with other components. Thus, an imaging apparatus with excellent durability and reduced abnormal noise can be realized.

According to the exemplary embodiments of the present invention, the thickness of a multiple end turn portion at an end portion of a coil spring during assembly is set greater than a gap between a rotor and a gear after assembly, so that even if the coil spring is bent, the end turn portion is not caught in the gap. This realizes a vibration-type actuator that allows a friction contact surface to be pressed uniformly to enable stable driving with reduced uneven rotation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178056 filed Aug. 10, 2012, which is hereby incorporated by reference herein in its entirety.

What is claimed is:

1. A vibration-type actuator comprising:
   a vibration member;
   a driven member configured to move relative to the vibration member by a vibration of the vibration member;
   an output member connected to the driven member;
   a shaft inserted in a through-hole in the vibration member;
   a fixing member coupled to the shaft and configured to support the output member; and
   a coil spring provided between the driven member and the output member and configured to bring the driven member into pressure contact with the vibration member,
   wherein the coil spring includes, at an end portion thereof, a first end turn portion with a plural number of turns,
   wherein the coil spring is connected to the output member at the first end turn portion, and
   wherein a thickness of the first end turn portion is greater than a gap between the driven member and the output member.

2. The vibration-type actuator according to claim 1, wherein the coil spring is connected to a spring receiving member of the output member at a side surface of the first end turn portion.

3. The vibration-type actuator according to claim 1, wherein the coil spring further includes, at another end portion thereof, a second end turn portion with a plural number of turns.

4. The vibration-type actuator according to claim 3, wherein the coil spring is connected to a spring receiving member of the driven member at a side surface of the second end turn portion.

5. The vibration-type actuator according to claim 1, wherein a side surface of the first end turn portion of the coil spring connected to a spring receiving member of the output member is an outer side surface.

6. The vibration-type actuator according to claim 1, wherein a side surface of the first end turn portion of the coil spring connected to a spring receiving member of the output member is an inner side surface.

7. The vibration-type actuator according to claim 1, wherein the vibration member includes an elastic member, wherein an electro-mechanical energy conversion element is provided for a first surface of the elastic member,
   wherein a second surface of the elastic member on an opposite side to the first surface contacts the driven member,
   wherein a protruding portion is formed on the second surface, and
   wherein the protruding portion faces an inner side portion of the driven member.

8. The vibration-type actuator according to claim 1, wherein the coil spring is provided in a space surrounded by the vibration member, the output member, and the driven member.

9. An imaging apparatus comprising:
   a power button;
   a display panel;
   a lens barrel; and
   the vibration-type actuator according to claim 1 adjacent to the lens barrel.

* * * * *